United States Patent
Saito

(10) Patent No.: US 9,689,456 B2
(45) Date of Patent: Jun. 27, 2017

(54) MAGNETORHEOLOGICAL FLUID SHOCK ABSORBER

(71) Applicant: KAYABA INDUSTRY CO., LTD., Tokyo (JP)

(72) Inventor: Keiji Saito, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/440,604

(22) PCT Filed: Mar. 10, 2014

(86) PCT No.: PCT/JP2014/056175
§ 371 (c)(1),
(2) Date: May 5, 2015

(87) PCT Pub. No.: WO2014/148296
PCT Pub. Date: Sep. 25, 2014

(65) Prior Publication Data
US 2015/0300443 A1    Oct. 22, 2015

(30) Foreign Application Priority Data
Mar. 21, 2013   (JP) .................................. 2013-058518

(51) Int. Cl.
| | | |
|---|---|---|
| *F16F 9/53* | (2006.01) | |
| *F16F 9/32* | (2006.01) | |
| *F16F 15/00* | (2006.01) | |
| *F16F 15/03* | (2006.01) | |

(52) U.S. Cl.
CPC ............ *F16F 9/535* (2013.01); *F16F 9/3214* (2013.01); *F16F 15/005* (2013.01); *F16F 15/03* (2013.01); *F16F 2226/04* (2013.01)

(58) Field of Classification Search
CPC ........ F16F 9/535; F16F 9/3214; F16F 15/005; F16F 15/03
USPC ................................................ 188/267, 267.2
See application file for complete search history.

(56) References Cited

U.S. PATENT DOCUMENTS

| | | | | |
|---|---|---|---|---|
| 6,311,810 B1 * | 11/2001 | Hopkins | .................. | F16F 9/535 |
| | | | | 188/267.2 |
| 6,390,252 B1 * | 5/2002 | Namuduri | ............... | F16F 9/535 |
| | | | | 188/267 |
| 6,419,058 B1 * | 7/2002 | Oliver | ..................... | F16F 9/535 |
| | | | | 188/267.1 |

(Continued)

FOREIGN PATENT DOCUMENTS

| | | |
|---|---|---|
| CN | 104081081 A | 10/2014 |
| EP | 1270988 A1 | 1/2003 |

(Continued)

*Primary Examiner* — Thomas Irvin
(74) *Attorney, Agent, or Firm* — Rabin & Berdo, P.C.

(57) ABSTRACT

The entire length of a piston (20) of a magnetorheological fluid shock absorber (100) is reduced. The piston (20) includes a piston core (30) mounted on an end portion of a piston rod (21) and having a coil (33) provided on an outer periphery, a flux ring (35) surrounding the outer periphery of the piston core (30) and forming a flow passage for a magnetorheological fluid, a plate (40) formed annularly, arranged on an outer periphery of the piston rod, and joined to one end of the flux ring (35) through brazing, and a stopper containing a fixing nut (50). The flux ring (35) and the plate (40) are joined by a metal layer.

7 Claims, 5 Drawing Sheets

(56) References Cited

U.S. PATENT DOCUMENTS

| | | | |
|---|---|---|---|
| 8,327,984 B2 * | 12/2012 | Foister | F16F 9/535 188/267 |
| 2014/0076676 A1 * | 3/2014 | Nehl | F16F 9/535 188/267 |
| 2015/0008081 A1 | 1/2015 | Saito et al. | |
| 2015/0021130 A1 * | 1/2015 | Saito | F16F 9/19 188/267.2 |
| 2015/0129378 A1 * | 5/2015 | Saito | F16F 9/535 188/267.2 |

FOREIGN PATENT DOCUMENTS

| | | |
|---|---|---|
| JP | 2008-002614 A | 1/2008 |
| JP | 2008-175364 A | 7/2008 |
| JP | 2008-175369 A | 7/2008 |
| JP | 2009-243674 A | 10/2009 |
| WO | WO 2012-155394 A1 | 11/2012 |
| WO | WO 2013-129162 A1 | 9/2013 |
| WO | WO 2014-024670 A1 | 2/2014 |

\* cited by examiner

US 9,689,456 B2

MAGNETORHEOLOGICAL FLUID SHOCK ABSORBER

TECHNICAL FIELD

The present invention relates to a magnetorheological fluid shock absorber using a magnetorheological fluid in which apparent viscosity is changed by an action of a magnetic field.

BACKGROUND ART

As a shock absorber mounted on a vehicle such as an automobile, a shock absorber which changes a damping force by changing apparent viscosity of a magnetorheological fluid by causing a magnetic field to act on a flow passage through which the magnetorheological fluid passes. JP2008-175364A discloses a magnetorheological fluid shock absorber in which, when a piston assy provided with a piston core around which a coil is wound on an outer periphery and a piston ring arranged on the outer periphery of the piston core slides through a cylinder, a magnetorheological fluid passes through a flow passage formed between the piston core and the piston ring.

SUMMARY OF INVENTION

However, in the magnetorheological fluid shock absorber in JP 2008-175364A, since the piston ring is arranged at a predetermined position with respect to the piston core, a pair of plates sandwiching the piston ring in an axial direction is provided, and each of the plates is fixed by fastening nuts. As described above, due to a configuration in which the piston ring is sandwiched and fixed by the plates and the nuts from both ends, there is a concern that an entire length of the piston assy is extended and a stroke length of the piston assy is reduced.

The present invention has an object to reduce the entire length of the piston of the magnetorheological fluid shock absorber.

According to one aspect of the present invention, a magnetorheological fluid shock absorber includes a cylinder in which a magnetorheological fluid whose viscosity is changed by an action of a magnetic field is sealed, a piston slidably arranged in the cylinder and defining a pair of fluid chambers in the cylinder, and a piston rod connected to the piston and extending to an outside of the cylinder. The piston includes a piston core mounted on an end portion of the piston rod and having a coil provided on an outer periphery, a ring body surrounding the outer periphery of the piston core and forming a flow passage for a magnetorheological fluid between the ring body and the piston core, a plate formed annularly, arranged on the outer periphery of the piston rod, and joined by a metal layer through brazing to one end of the ring body, and a stopper sandwiching the plate between the stopper and the piston core.

DESCRIPTION OF EMBODIMENTS

An embodiment of the present invention will be explained below by referring to the attached drawings.

Figure 1:
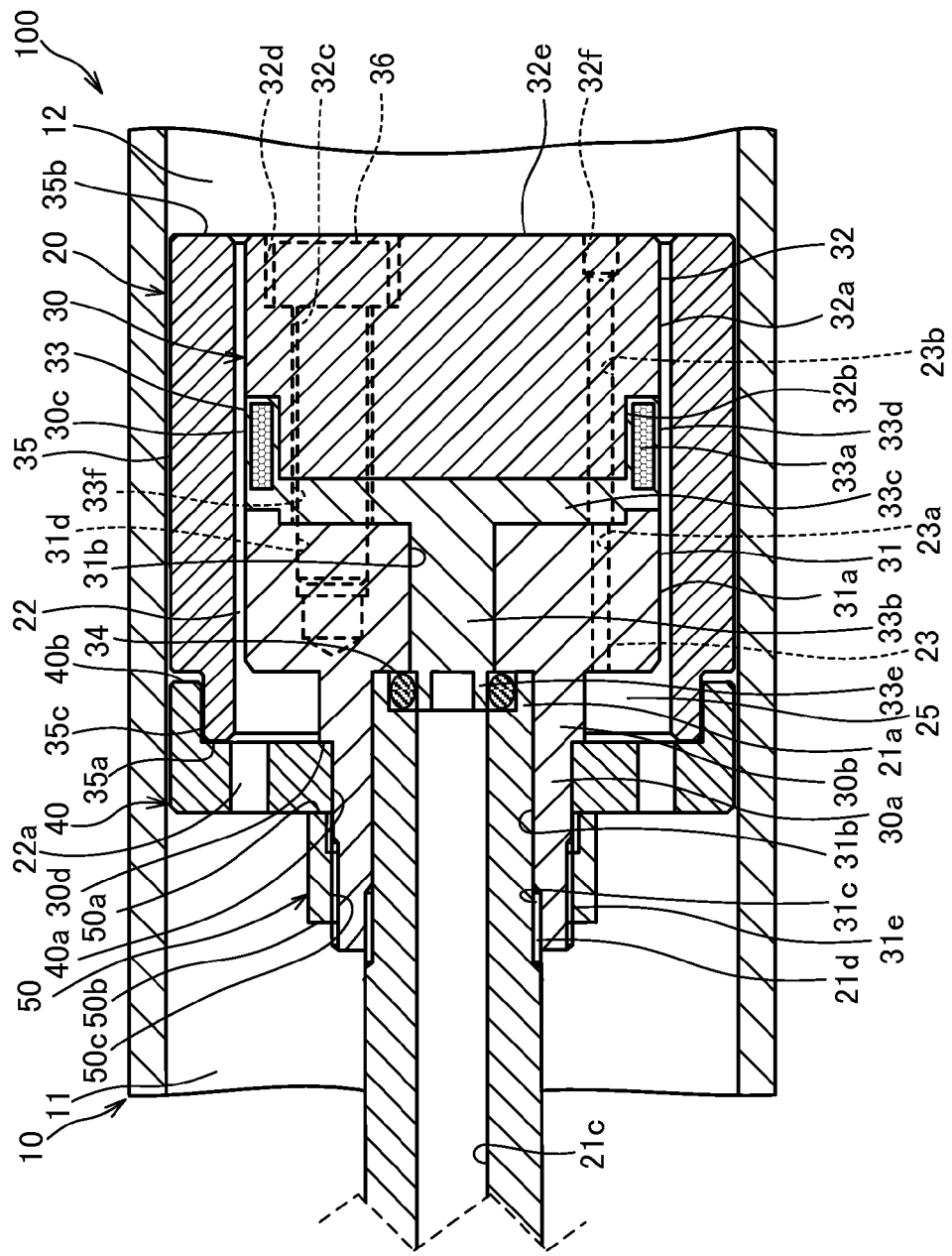
FIG. 1 is a sectional view of a front of a magnetorheological fluid shock absorber according to an embodiment of the present invention.
Figure 1:
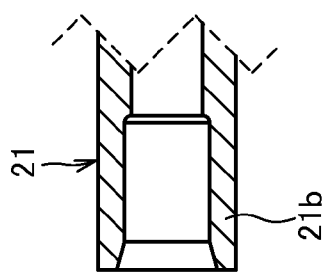

First, by referring to FIG. 1, an entire configuration of a magnetorheological fluid shock absorber (hereinafter referred to simply as a "shock absorber") 100 according to the embodiment of the present invention will be explained.

The shock absorber 100 is a damper with a changeable damping coefficient by using a magnetorheological fluid whose viscosity is changed by an action of a magnetic field. The shock absorber 100 is interposed between a vehicle body and an axle in a vehicle such as an automobile, for example. The shock absorber 100 generates a damping force for suppressing vibration of a vehicle body by a telescopic operation.

The shock absorber 100 is provided with a cylinder 10 with a magnetorheological fluid sealed therein, a piston 20 slidably arranged in the cylinder 10, and a piston rod 21 connected to the piston 20 and extended to an outside of the cylinder 10.

The cylinder 10 is formed having a cylindrical shape with a bottom. The magnetorheological fluid sealed in the cylinder 10 has its apparent viscosity changed by the action of the magnetic field and is a liquid in which minute particles having ferromagnetism is distributed in a liquid such as oil and the like. The viscosity of the magnetorheological fluid changes in accordance with strength of the acting magnetic field and returns to an original state when an influence of the magnetic field is gone.

In the cylinder 10, a gas chamber (not shown) in which a gas is sealed is defined through a free piston (not shown). A volume change in the cylinder 10 caused by advance/retreat of the piston rod 21 is compensated for by providing the gas chamber.

The piston 20 defines a fluid chamber 11 and a fluid chamber 12 in the cylinder 10. The piston 20 has an annular flow passage 22 allowing the magnetorheological fluid to be movable between the fluid chamber 11 and the fluid chamber 12 and a bypass flow passage 23 which is a through hole. The piston 20 can slide through the cylinder 10 by passage of the magnetorheological fluid through the flow passage 22 and the bypass flow passage 23. A configuration of the piston 20 will be explained later in detail.

The piston rod 21 is formed coaxially with the piston 20. The piston rod 21 has one end 21a fixed to the piston 20 and the other end 21b extended to an outside of the cylinder 10. The piston rod 21 is formed having a cylindrical shape with the one end 21a and the other end 21b opened. In an inner periphery 21c of the piston rod 21, a pair of wirings (not shown) for supplying an electric current to a coil 33a of the piston 20 which will be described later is passed. A male screw 21d screwed with the piston 20 is formed on an outer periphery in the vicinity of the one end 21a of the piston rod 21.

Subsequently, a configuration of a piston 20 will be explained by referring to FIGS. 1 to 3.

The piston 20 is provided with a piston core 30 including a small diameter portion 30a mounted on an end portion of the piston rod 21, an enlarged diameter portion 30b formed having a diameter larger than the small diameter portion 30a continuously in an axial direction and forming a stepped portion 30d between itself and the small diameter portion 30a, and a large diameter portion 30c formed having a diameter larger than the enlarged diameter portion 30b continuously in the axial direction and having a coil 33a provided on an outer periphery.

Moreover, the piston 20 is provided with a flux ring 35 as a ring body surrounding the outer periphery of the piston core 30 and forming the flow passage 22 of the magnetorheological fluid between itself and the piston core 30, a plate 40 formed annularly, arranged on an outer periphery of the small diameter portion 30a and mounted on one end 35a of the flux ring 35, and a fixing nut 50 mounted on the small diameter portion 30a as a stopper for sandwiching the plate 40 between itself and the stepped portion 30d.

The piston core 30 is provided with a first core 31 mounted on an end portion of the piston rod 21, a coil assembly 33 on which the coil 33a is provided on the outer periphery, a second core 32 sandwiching the coil assembly 33 between itself and the first core 31, and a pair of bolts 36 as fastening members for fastening the second core 32 and the coil assembly 33 to the first core 31.

Moreover, the piston core 30 is provided with a bypass flow passage 23 formed by penetrating in an axial direction at a position where an influence of a magnetic field generated by the coil 33a is smaller than that of the flow passage 22. The bypass flow passage 23 has a first through hole 23a formed by penetrating the first core 31 and a second through hole 23b formed by penetrating the second core 32 and the coil assembly 33. The bypass flow passages 23 are formed at two spots at an interval of 180° as illustrated in FIG. 3. This is not limiting, and the number of the bypass flow passages 23 is arbitrary, or the bypass flow passage 23 does not have to be provided.

The first core 31 has the small diameter portion 30a, the enlarged diameter portion 30b, a large diameter portion 31a forming a part of the large diameter portion 30c of the piston core 30, a through hole 31b penetrating the center in the axial direction, and the first through hole 23a forming a part of the bypass flow passage 23.

The small diameter portion 30a is formed having a cylindrical shape protruding in the axial direction from the flux ring 35. A female screw 31c screwed with the male screw 21d of the piston rod 21 is formed on the inner periphery of the small diameter portion 30a. The piston core 30 is fastened to the piston rod 21 by screwing between the male screw 21d and the female screw 31c.

The enlarged diameter portion 30b is formed having a cylindrical shape. The enlarged diameter portion 30b is formed coaxially with and continuously to the small diameter portion 30a. The annular stepped portion 30d is formed between the small diameter portion 30a and the enlarged diameter portion 30b. With the stepped portion 30d, the plate 40 is brought into contact, and the stepped portion 30d is to sandwich the plate 40 between itself and the fixing nut 50. Moreover, on the outer periphery on a tip end of the small diameter portion 30a, a male screw 31e with which a female screw 50c of the fixing nut 50 is screwed in the state in which the plate 40 is sandwiched is formed.

The large diameter portion 31a is formed having a cylindrical shape. The large diameter portion 31a is formed coaxially with and continuously to the enlarged diameter portion 30b. The outer periphery of the large diameter portion 31a is faced with the flow passage 22 through which the magnetorheological fluid passes. The large diameter portion 31a is brought into contact with the coil assembly 33. A cylinder portion 33b of the coil assembly 33 which will be described later is inserted into and fitted with the through hole 31b of the large diameter portion 31a. On the large diameter portion 31a, a pair of female screws 31d with which bolts 36 are screwed is formed.

The first through hole 23a penetrates the large diameter portion 31a of the first core 31 in the axial direction. The first through holes 23a are, as illustrated in FIG. 3, formed at two spots at an interval of 180°. In the first through hole 23a, a damping characteristic during sliding of the piston 20 is set by its hole diameter.

The second core 32 has a large diameter portion 32a forming a part of the large diameter portion 30c of the piston core 30, a small diameter portion 32b formed on one end of the large diameter portion 32a with a diameter smaller than the large diameter portion 32a, a through hole 32c through which a bolt 36 penetrates, a deep counterbore portion 32d with which a head part of the bolt 36 is engaged, the second through hole 23b forming a part of the bypass flow passage 23, and a plurality of tool holes 32f with which tools (not shown) for rotating the piston 20 are engaged.

The large diameter portion 32a is formed having a columnar shape. The large diameter portion 32a is formed having the same diameter as the large diameter portion 31a of the first core 31. The outer periphery of the large diameter portion 32a is faced with the flow passage 22 through which the magnetorheological fluid passes. The large diameter portion 32a is formed so that an end surface 32e faced with the fluid chamber 12 is flush with the other end 35b of the flux ring 35.

The small diameter portion 32b is formed having a columnar shape coaxial with the large diameter portion 32a. The small diameter portion 32b is formed having the same diameter as the inner periphery of a coil mold portion 33d of the coil assembly 33 which will be described later and fitted in an inner periphery of the coil mold portion 33d.

The through holes 32c are formed in a pair by penetrating the second core 32 in the axial direction. The through hole 32c is formed having a diameter larger than a diameter of a screwed portion of the bolt 36. The through hole 32c is formed so as to be coaxial with the female screw 31d of the first core 31 in a state in which the piston core 30 is assembled.

The deep counterbore portion 32d is formed on an end portion of the through hole 32c. The deep counterbore portion 32d is formed having a diameter larger than the through hole 32c and larger than the head part of the bolt 36. The deep counterbore portion 32d is formed having a depth capable of fully accommodating the head part of the bolt 36. When the bolt 36 inserted into the through hole 32c is screwed with the female screw 31d of the first core 31, a bottom surface of the deep counterbore portion 32d is pressed onto the first core 31, and the second core 32 is pressed onto the first core 31.

The second through hole 23b is formed having a diameter larger than the first through hole 23a. The second through holes 23b are formed at two spots at an interval of 180° as illustrated in FIG. 3. The second through hole 23b is formed so as to be coaxial with the first through hole 23a in a state in which the piston core 30 is assembled. The damping characteristic during sliding of the piston 20 is determined by a hole diameter of the first through hole 23a. The hole diameter of the second through hole 23b does not influence on the damping characteristic during sliding of the piston 20.

The tool hole 32f is a hole in which the tool is fitted when the piston 20 is screwed with the piston rod 21. The tool holes 32f are formed at four spots at intervals of 90° as illustrated in FIG. 3. In this embodiment, two of the four tool holes 32f are formed on the end portion of the second through hole 23b. As described above, the tool holes 32f are shared with the second through holes 23b.

The coil assembly 33 is formed by molding a resin in a state in which the coil 33a is inserted. The coil assembly 33 has the cylinder portion 33b fitted in the though hole 31b of the first core 31, a connection portion 33c sandwiched between the first core 31 and the second core 32, and the coil mold portion 33d with the coil 33a provided inside.

The coil 33a forms a magnetic field by an electric current supplied from the outside. The larger the current supplied to the coil 33a becomes, the stronger the strength of this magnetic field becomes. When the current is supplied to the coil 33a and the magnetic field is formed, apparent viscosity of the magnetorheological fluid flowing through the flow passage 22 is changed. The stronger the magnetic field by the coil 33a becomes, the higher the viscosity of the magnetorheological fluid becomes.

The cylinder portion 33b has a tip end portion 33e fitted with the inner periphery of the piston rod 21. A pair of wiring for supplying the current to the coil 33a is led out of the tip end of the cylinder portion 33b. An O-ring 34 as a sealing member is provided between the tip end portion 33e of the cylinder portion 33b and the one end 21a of the piston rod 21.

The O-ring 34 is compressed in the axial direction by the large diameter portion 31a of the first core 31 and the piston rod 21 and compressed in a radial direction by the tip end portion 33e of the coil assembly 33 and the piston rod 21. As a result, the magnetorheological fluid intruding between the outer periphery of the piston rod 21 and the first core 31 or between the first core 31 and the coil assembly 33 is prevented from flowing out to the inner periphery of the piston rod 21 or leaking out.

The connection portion 33c is formed continuously from a base end portion of the cylinder portion 33b in the radial direction. The connection portion 33c connects the cylinder portion 33b and the coil mold portion 33d to each other. A pair of wirings for supplying the current to the coil 33a passes through the connection portion 33c and the cylinder portion 33b. The connection portion 33c has a through hole 33f through which the bolt 36 penetrates.

The through hole 33f is formed having the same diameter as the through hole 32c of the second core 32. The through hole 33f is formed so as to be coaxial with the female screw 31d of the first core 31 and also to be continuous to the through hole 32c in a state in which the piston core 30 is assembled.

The coil mold portion 33d is installed upright annularly from an outer edge portion of the connection portion 33c. The coil mold portion 33d is formed by protruding on an end portion on a side opposite to the cylinder portion 33b in the coil assembly 33. The coil mold portion 33d is formed having the same diameter as the large diameter portion 31a of the first core 31. An outer periphery of the coil mold portion 33d forms a part of the large diameter portion 30c of the piston core 30. The coil 33a is provided inside the coil mold portion 33d.

As described above, the piston core 30 is formed by being split into three members, that is, the first core 31, the second core 32, and the coil assembly 33. Thus, it is only necessary to form only the coil assembly 33 on which the coil 33a is provided by molding and sandwiching the same between the first core 31 and the second core 32. Thus, as compared with a case in which the piston core 30 is formed as a single body and is subjected to a molding work, formation of the piston core 30 is easier.

In the piston core 30, the first core 31 is fixed to the piston rod 21, but the coil assembly 33 and the second core 32 are only fitted in the axial direction. Thus, in the piston 20, the second core 32 and the coil assembly 33 are fixed so as to be pressed onto the first core 31 by fastening the pair of bolts 36.

The bolt 36 is screwed with the female screw 31d of the first core 31 by inserting into the through hole 32c of the second core 32 and the through hole 33f of the coil assembly 33. The bolt 36 presses the bottom surface of the deep counterbore portion 32d toward the first core 31 by its fastening force. As a result, the coil assembly 33 is sandwiched between the second core 32 and the first core 31, and the piston core 30 is integrated.

As described above, only by fastening the bolt 36, the second core 32 and the coil assembly 33 are pressed onto the first core 31 and fixed. Therefore, the piston core 30 can be assembled easily.

The flux ring 35 is formed having a substantially cylindrical shape. An outer periphery of the flux ring 35 is formed having the substantial same diameter as the inner periphery of the cylinder 10. The inner periphery of the flux ring 35 is faced with the outer periphery of the piston core 30. The inner periphery of the flux ring 35 is formed having a diameter larger than the outer periphery of the piston core 30, and the flow passage 22 is formed between itself and the piston core 30. The flux ring 35 is fixed to the piston core 30 through the plate 40 so as to be coaxial with the piston core 30.

The flux ring 35 has a small diameter portion 35c formed on the one end 35a and in which the plate 40 is fitted. The small diameter portion 35c is formed having a diameter smaller than the other portion of the flux ring 35 so that the plate 40 is fitted in the outer periphery.

The plate 40 supports the one end 35a of the flux ring 35 with respect to the piston core 30 and regulates the position in the axial direction. The outer periphery of the plate 40 is formed having the same diameter as or a diameter smaller than the outer periphery of the flux ring 35.

Figure 2:
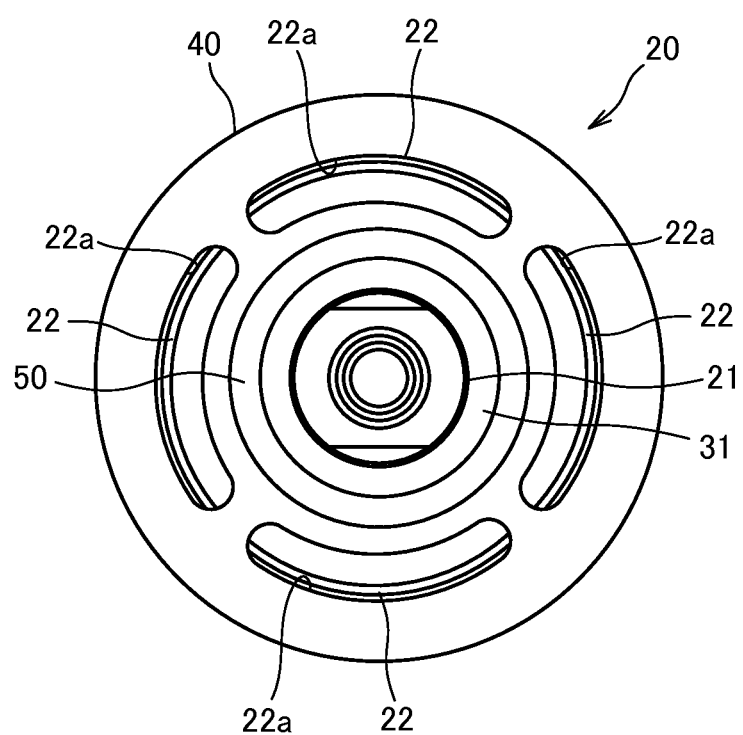
FIG. 2 is a left side view of a piston in FIG. 1.
Figure 3:
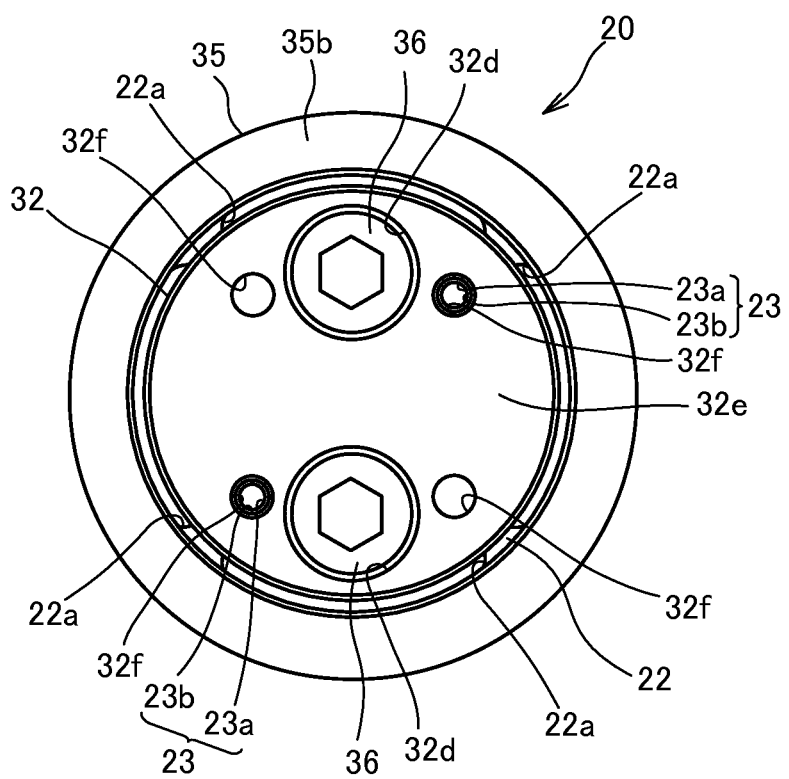
FIG. 3 is a right side view of the piston in FIG. 1.

The plate 40 has a plurality of flow passages 22a which are through holes communicating with the flow passage 22 as illustrated in FIG. 2. The flow passages 22a are formed each having an arc shape and arranged at intervals of equal angle. In this embodiment, the flow passages 22a are formed at four spots at intervals of 90°. The flow passage 22a is not limited to the arc shape but may be a plurality of circular through holes.

Between the plate 40 and the large diameter portion 30c of the piston core 30, a bypass branch path 25 for leading the magnetorheological fluid flowing in from the flow passage 22a to the bypass flow passage 23 is formed. The bypass branch path 25 is an annular clearance formed on the outer periphery of the enlarged diameter portion 30b.

The magnetorheological fluid flowing into the piston core 30 from the flow passage 22a flows through the flow passage 22 and the bypass flow passage 23 through the bypass branch path 25. Thus, since there is no need to align relative positions in a circumferential direction of the flow passage 22a and the bypass flow passage 23, assembling of the piston 20 is easy.

On the inner periphery of the plate 40, a through hole 40a in which the small diameter portion 30a of the first core 31 is fitted is formed. The plate 40 has its coaxiality with the first core 31 ensured by fitting the small diameter portion 30a in the through hole 40a.

On the outer periphery of the plate 40, an annular flange portion 40b fitted in the small diameter portion 35c of the one end 35a of the flux ring 35 is formed. The flange portion 40b is formed by protruding in the axial direction toward the flux ring 35. The flange portion 40b is fixed by being brazed to the small diameter portion 35c. A structure of a joint portion between the plate 40 and the flux ring 35 will be explained later in detail by referring to FIG. 4.

The plate 40 is pressed onto the stepped portion 30d by the fastening force of the fixing nut 50 with respect to the small diameter portion 30a of the piston core 30 and is sandwiched. As a result, the axial position of the flux ring 35 fixed to the plate 40 with respect to the piston core 30 is regulated.

The fixing nut 50 is formed having a substantially cylindrical shape and is mounted on the outer periphery of the small diameter portion 30a of the piston core 30. The fixing nut 50 has a tip end portion 50a brought into contact with the plate 40. The fixing nut 50 has the female screw 50c screwed with the male screw 31e of the first core 31 formed on the inner periphery of a base end portion 50b. As a result, the fixing nut 50 is screwed with the small diameter portion 30a.

As described above, the plate 40 mounted on the one end 35a of the flux ring 35 is sandwiched by the stepped portion 30d of the piston core 30 mounted on the end portion of the piston rod 21 and the fixing nut 50 screwed with the small diameter portion 30a. As a result, the flux ring 35 is fixed in the axial direction with respect to the piston core 30. Thus, there is no need to provide another member protruding in the axial direction from the other end 35b of the flux ring 35 in order to regulate the axial position of the flux ring 35. Therefore, the entire length of the piston 20 in the shock absorber 100 can be reduced.

Subsequently, the joint portion between the plate 40 and the flux ring 35 will be explained in detail by referring to FIG. 4.

The flux ring 35 has the small diameter portion 35c formed having a diameter smaller than the other portions of the flux ring 35 on the one end 35a. On the other hand, the plate 40 has the flange portion 40b formed annularly by protruding in the axial direction and joined to the small diameter portion 35c by fitting. In FIG. 4, an interval between the small diameter portion 35c of the flux ring 35 and the flange portion 40b of the plate 40 is enlarged in illustration for facilitation of understanding.

A gap 61 is formed between a tip end portion 40c of the flange portion 40b and a base end portion 35f of the small diameter portion 35c. The flux ring 35 has an axial position regulated by the tip end portion 35d of the small diameter portion 35c brought into contact with an inner surface 40d of the plate 40.

Figure 4:
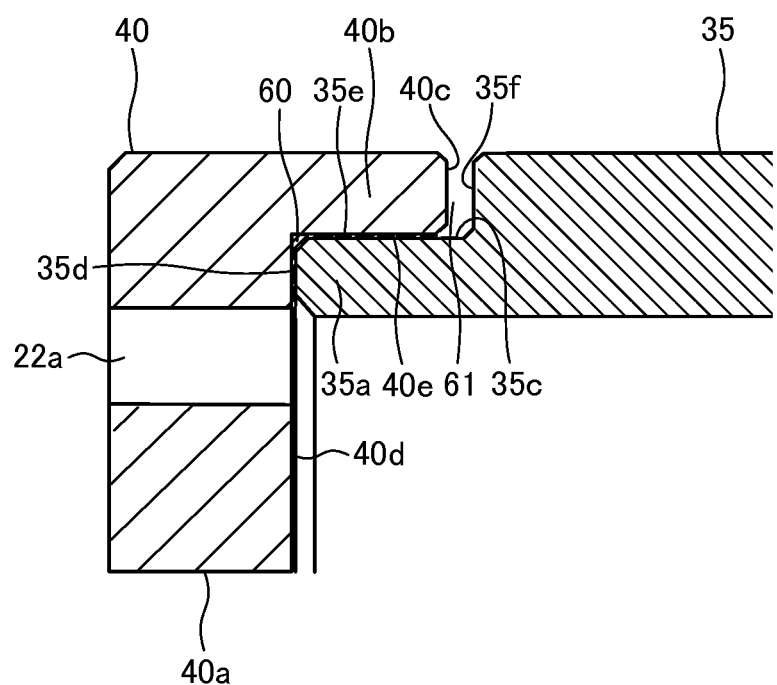
FIG. 4 is an enlarged view of a joint portion between a plate and a ring body in FIG. 1.

In a state illustrated in FIG. 4, metal used for brazing is poured into the gap between the small diameter portion 35c and the flange portion 40b in a melted state. The poured metal flows into the gap between the small diameter portion 35c and the flange portion 40b by means of a capillary phenomenon and is solidified when being cooled. As a result, a metal layer 60 is formed between the small diameter portion 35c and the flange portion 40b. Since the small diameter portion 35c and the flange portion 40b are planarly joined by this metal layer 60, the plate 40 is firmly joined to the one end of the flux ring 35.

The flux ring 35 is joined to the plate 40 by the metal layer 60 formed on at least either one of a gap between the outer peripheral surface 35e of the small diameter portion 35c and an inner peripheral surface 40e of the flange portion 40b and the gap between the tip end portion 35d of the small diameter portion 35c and the inner surface 40d of the plate 40. Brazing is performed so that metal does not leak out of a region where the small diameter portion 35c and the flange portion 40b are brought into contact with each other on a face-to-face basis.

The metal layer 60 is formed by copper based metal. This is not limiting, and other metals such as nickel or silver may be used depending on the materials of the flux ring 35 and the plate 40.

As described above, the flux ring 35 and the plate 40 are joined by the metal layer 60 through brazing. Thus, as compared with joint using crimping or fastening, the flux ring 35 and the plate 40 can be easily joined. Moreover, the small diameter portion 35c of the flux ring 35 and the flange portion 40b of the plate 40 are planarly joined by the metal layer 60. Thus, sufficient falling strength of the flux ring 35 with respect to the plate 40 can be obtained.

An assembling procedure of the piston 20 will be explained below.

First, the piston core 30 is assembled. First, the second core 32 is mounted on the coil assembly 33. It is mounted so that the small diameter portion 32b of the second core 32 is fitted in the inner periphery of the coil mold portion 33d of the coil assembly 33.

Subsequently, the first core 31 is mounted on an assembly of the coil assembly 33 and the second core 32. The cylinder portion 33b of the coil assembly 33 is inserted into the through hole 3 lb of the first core 31 from the large diameter portion 31a side, and the pair of wirings for supplying the current to the coil 33a is pulled out of the through hole 31b of the first core 31 on the small diameter portion 30a side. Then, the pair of bolts 36 is inserted into the through hole 32c of the second core 32 and the through hole 33f of the coil assembly 33 and is screwed with the female screw 31c of the first core 31. By fastening of the bolts 36, the assembling of the piston core 30 is completed.

In parallel with the assembling of the piston core 30, the flux ring 35 and the plate 40 are assembled integrally. Specifically, the flange portion 40b of the plate 40 is fitted with the small diameter portion 35c of the flux ring 35 and brazed.

Subsequently, the plate 40 integrally assembled with the flux ring 35 is assembled to the piston core 30. Specifically, the plate 40 is fitted in the outer periphery of the small diameter portion 30a of the first core 31 in the piston core 30 and is brought into contact with the stepped portion 30d of the first core 31. Then, the fixing nut 50 is screwed with the small diameter portion 30a. As a result, the plate 40 is sandwiched between the fixing nut 50 and the stepped portion 30d. By means of the above-described procedure, the piston 20 is assembled.

After the piston 20 is assembled, the piston 20 is mounted on the piston rod 21. Specifically, the tool is fitted in the tool hole 32f, and the piston 20 is rotated around a center axis. At this time, the pair of wirings for supplying the current to the coil 33a is inserted into the inner periphery 21c of the piston rod 21. As a result, the female screw 31c of the first core 31 of the piston core 30 and the male screw 21d of the piston rod 21 are screwed together. At this time, the O-ring 34 is inserted in advance between the tip end portion 33e of the piston rod 21 and the one end 21a of the piston rod 21.

As described above, by assembling the piston 20 assembled in advance to the piston rod 21, assembling of the piston 20 and the piston rod 21 can be performed easily.

In this embodiment, the piston 20 is split into three members, that is, the first core 31, the second core 32, and the coil assembly 33. However, instead of this configuration, the first core 31 and the coil assembly 33 may be integrally formed so as to have two members or the second core 32 and the coil assembly 33 may be integrally formed so as to have two members.

Subsequently, an action of the shock absorber 100 will be explained.

When the shock absorber 100 operates telescopically and the piston rod 21 advances/retreats with respect to the cylinder 10, the magnetorheological fluid flows through the flow passage 22 and the bypass flow passage 23 through the flow passages 22a formed in the plate 40 and the bypass branch path 25. As a result, the magnetorheological fluid moves between the fluid chamber 11 and the fluid chamber 12, whereby the piston 20 slides through the cylinder 10.

At this time, the first core 31, the second core 32, and the flux ring 35 of the piston core 30 are formed by a magnetic material and constitute a magnetic path leading a magnetic flux generated around the coil 33a. Moreover, the plate 40 is formed by a non-magnetic material. Thus, the flow passage 22 between the piston core 30 and the flux ring 35 becomes a magnetic gap through which the magnetic flux generated around the coil 33a passes. As a result, during the telescopic operation of the shock absorber 100, the magnetic field of the coil 33a acts on the magnetorheological fluid flowing through the flow passage 22.

Adjustment of the damping force generated by the shock absorber 100 is made by changing an electrified amount to the coil 33a and by changing strength of the magnetic field acting on the magnetorheological fluid flowing through the flow passage 22. Specifically, the larger the current supplied to the coil 33a becomes, the stronger the magnetic field generated around the coil 33a becomes. Thus, the viscosity of the magnetorheological fluid flowing through the flow passage 22 becomes high, and the damping force generated by the shock absorber 100 becomes larger.

On the other hand, the bypass flow passage 23 is formed by the first through hole 23a formed in the first core 31 of the piston core 30 and the second through hole 23b formed in the second core 32 and the coil assembly 33. The annular bypass branch path 25 is defined between the piston core 30 and the plate 40. The bypass flow passage 23 has one end communicating with the flow passage 22a through the bypass branch path 25 and the other end opened in the end surface 32e of the piston 20.

The bypass flow passage 23 is defined by the first through hole 23a and the second through hole 23b penetrating the piston core 30 made of the magnetic material in the axial direction. The coil 33a is built in the outer periphery portion of the piston core 30. Thus, the magnetorheological fluid flowing through the bypass flow passage 23 is hardly subjected to the magnetic field of the coil 33a.

By providing the bypass flow passage 23, during the telescopic operation of the shock absorber 100, pressure fluctuation generated when a current value of the coil 33a is adjusted by flow passage resistance is alleviated. Therefore, occurrence of an impact, a noise and the like caused by rapid pressure fluctuation is prevented. In the shock absorber 100, an inner diameter or a length of the first through hole 23a of the bypass flow passage 23 is set in accordance with a required damping characteristic.

According to the above-described embodiment, the following effects are exerted.

In the shock absorber 100, the plate 40 mounted on the one end 35a of the flux ring 35 is sandwiched between the stepped portion 30d of the piston core 30 mounted on the end portion of the piston rod 21 and the fixing nut 50 screwed with the small diameter portion 30a. As a result, the flux ring 35 is fixed in the axial direction with respect to the piston core 30. Thus, there is no need to provide another member protruding in the axial direction from the other end 35b of the flux ring 35 in order to regulate the axial position of the flux ring 35. Therefore, the entire length of the piston 20 of the shock absorber 100 can be reduced.

Moreover, the flux ring 35 and the plate 40 are joined by the metal layer 60 through brazing. Thus, as compared with joint using crimping or fastening, the flux ring 35 and the plate 40 can be easily joined. Moreover, the small diameter portion 35c of the flux ring 35 and the flange portion 40b of the plate 40 are planarly joined by the metal layer 60. Thus, sufficient falling strength of the flux ring 35 with respect to the plate 40 can be obtained.

Figure 5:
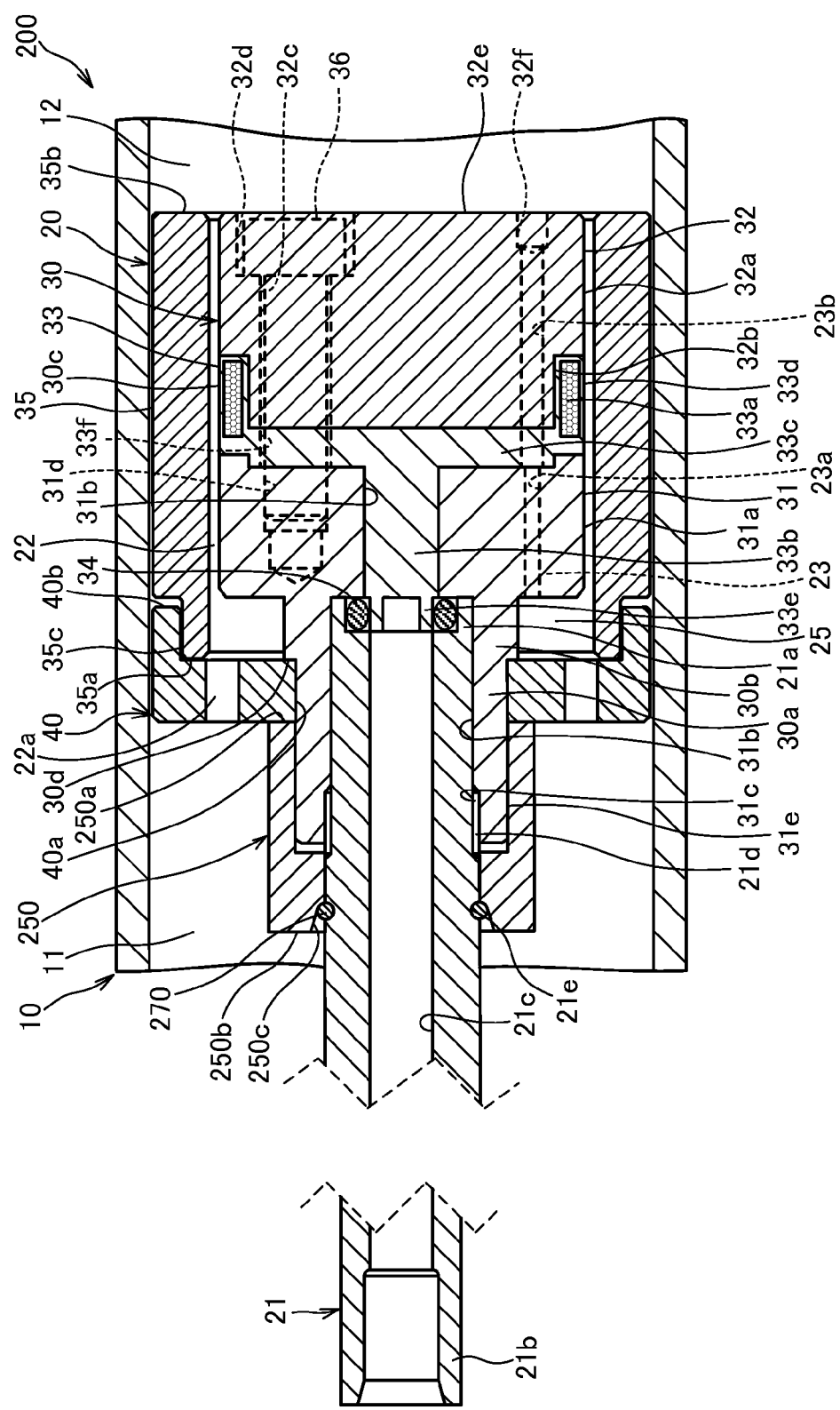
FIG. 5 is a sectional view of a front of a magnetorheological fluid shock absorber according to a variation of the embodiment of the present invention.

Subsequently, by referring to FIG. 5, a magnetorheological fluid shock absorber according to a variation of the embodiment of the present invention (hereinafter referred to simply as a "shock absorber") 200 will be explained. In the variation, the same reference numerals are given to the configurations similar to those in the above-described embodiment, and duplicated explanation will be omitted as appropriate.

The shock absorber 200 is different from the shock absorber 100 according to the above-described embodiment in a point that the plate 40 is fixed not by the fixing nut 50 but by using a C-ring 270 as a retaining ring.

On an outer periphery in the vicinity of the one end 21a of the piston rod 21, an annular groove 21e formed having a shape corresponding to an outer shape of the C-ring 270 is formed in conforming to a position where the C-ring 270 is provided.

A stopper 250 is formed having a substantially cylindrical shape and is fitted to an outer periphery of the small diameter portion 30a of the first core 31. The stopper 250 has its tip end portion 250a brought into contact with the plate 40. The stopper 250 has a tapered portion 250c formed having a tapered shape whose diameter is enlarged toward an end surface on an inner peripheral surface of a base end portion 250b.

The tapered portion 250c is brought into contact with the C-ring 270. In a state in which the tapered portion 250c is brought into contact with the C-ring 270, the stopper 250 can no longer move in the axial direction toward the other end 21b of the piston rod 21.

The C-ring 270 is a ring formed having a circular section. The C-ring 270 is formed having a C-shaped ring shape with a part of a periphery open. The C-ring 270 is fitted in the annular groove 21e by a force to contract to an inner periphery. The C-ring 270 is brought into contact with the tapered portion 250c of the stopper 250 and regulates an axial position of the base end portion 250b of the stopper 250.

An assembling procedure of the piston 20 will be explained below.

First, the flux ring 35 and the plate 40 are brazed in advance, and they are assembled to the piston core 30 having been integrally assembled. Specifically, the plate 40 is fitted in the outer periphery of the small diameter portion 30a of the first core 31 of the piston core 30 and is brought into contact with the stepped portion 30d of the first core 31. In this state, the plate 40 is only in contact with the stepped portion 30d and is not fixed in the axial direction.

Subsequently, the piston rod 21 and the stopper 250 are assembled. First, the C-ring 270 is fitted in the annular groove 21e of the piston rod 21. Then, the stopper 250 is fitted from the one end 21a of the piston rod 21. The stopper 250 has the tapered portion 250c on the inner peripheral surface of the base end portion 250b brought into contact with the C-ring 270, whereby the axial position is regulated.

Finally, the piston rod 21 and the piston core 30 are assembled. Specifically, the female screw 31c of the first core 31 of the piston core 30 and the male screw 21d of the piston rod 21 are screwed together. At this time, the O-ring 34 is inserted in advance between the tip end portion 33e of the piston core 30 and the one end 21a of the piston rod 21.

Then, by rotating the piston core 30 slowly with respect to the piston rod 21, the plate 40 assembled to the piston core 30 in advance is sandwiched between the stepped portion 30d of the first core 31 of the piston core 30 and the tip end portion 250a of the stopper 250. As a result, assembling of the piston 20 is completed.

As described above, the plate 40 is pressed onto the stopper 250 and fixed by a fastening force of the first core 31 of the piston core 30 to the piston rod 21. Therefore, the piston 20 can be easily assembled only by fastening the piston core 30 to the piston rod 21. Moreover, since each member of the piston 20 can be firmly fixed by the fastening force of the piston core 30, rotation of each member is prevented, and vibration is suppressed.

In the above-described variation, too, the plate 40 mounted on the one end 35a of the flux ring 35 is sandwiched between the piston core 30 mounted on an end portion of the piston rod 21 and the stopper 250 whose axial position is regulated with respect to the piston rod 21. As a result, the flux ring 35 is axially fixed with respect to the piston core 30. Thus, there is no need to provide another member protruding in the axial direction from the other end 35b of the flux ring 35 in order to regulate the axial position of the flux ring 35. Therefore, the entire length of the piston 20 of the shock absorber 200 can be shortened.

Embodiments of this invention were described above, but the above embodiments are merely examples of applications of this invention, and the technical scope of this invention is not limited to the specific constitutions of the above embodiments.

For example, in the shock absorbers 100 and 200, the pair of wirings for supplying an electric current to the coil 33a passes through the inner periphery of the piston rod 21. Thus, an earth for letting a current applied to the coil 33a escape to the outside can be abolished. However, instead of this configuration, it may be configured that only one wiring for applying a current to the coil 33a passes through the inside of the piston rod 21 and is earthed to the outside through the piston rod 21 itself.

This application claims priority based on Japanese Patent Application No. 2013-058518 filed with the Japan Patent Office on Mar. 21, 2013, the entire contents of which are incorporated into this specification.

The invention claimed is:

1. A magnetorheological fluid shock absorber comprising:
    a cylinder in which a magnetorheological fluid, whose viscosity is changed by an action of a magnetic field, is sealed;
    a piston slidably arranged in the cylinder and defining a pair of fluid chambers in the cylinder; and
    a piston rod connected to the piston and extending to an outside of the cylinder, wherein
    the piston includes:
    a piston core mounted on an end portion of the piston rod and having a coil provided on an outer periphery;
    a ring body surrounding the outer periphery of the piston core and forming a flow passage for a magnetorheological fluid between the ring body and the piston core;
    a plate formed annularly, arranged on the outer periphery of the piston core, and joined by a metal layer through brazing to one end of the ring body; and
    a stopper sandwiching the plate between the stopper and the piston core, wherein
    the ring body has a small diameter portion having a diameter smaller than that of another portion of the ring body on the one end,
    the plate has a flange portion formed annularly by protruding in an axial direction and joined by being fitted in the small diameter portion,
    a gap is formed between a tip end portion of the flange portion and a base end portion of the small diameter portion, the gap being for pouring a brazing filler metal into a joint portion between the flange portion and the small diameter portion,
    a portion of the gap, through which the brazing filler metal is poured, has a magnetorheological fluid therein after the pouring, and
    the portion of the gap extends for an entire distance between the tip end portion of the flange portion and the base end portion of the small diameter portion.

2. The magnetorheological fluid shock absorber according to claim 1, wherein the ring body has its axial position regulated by a tip end portion of the small diameter portion being brought into contact with an inner surface of the plate.

3. The magnetorheological fluid shock absorber according to claim 2, wherein the ring body is joined to the plate by the metal layer which is formed on at least either one of a gap between an outer peripheral surface of the small diameter portion and an inner peripheral surface of the flange portion and a gap between the tip end portion of the small diameter portion and the inner surface of the plate.

4. The magnetorheological fluid shock absorber according to claim 1, wherein the metal layer is formed by a copper based metal.

5. The magnetorheological fluid shock absorber according to claim 1, wherein the gap extends for an entire dimension of the tip end portion in a radial direction.

6. The magnetorheological fluid shock absorber according to claim 1, wherein the gap extends for an entire dimension of the base end portion in a radial direction.

7. A magnetorheological fluid shock absorber comprising:
    a cylinder in which a magnetorheological fluid, whose viscosity is changed by an action of a magnetic field, is sealed;
    a piston slidably arranged in the cylinder and defining a pair of fluid chambers in the cylinder; and
    a piston rod connected to the piston and extending to an outside of the cylinder, wherein
    the piston includes:
    a piston core mounted on an end portion of the piston rod and having a coil provided on an outer periphery;
    a ring body surrounding the outer periphery of the piston core and forming a flow passage for a magnetorheological fluid between the ring body and the piston core;
    a plate formed annularly, arranged on the outer periphery of the piston core, and joined by a metal layer through brazing to one end of the ring body; and
    a stopper sandwiching the plate between the stopper and the piston core, wherein
    the ring body has a small diameter portion having a diameter smaller than that of another portion of the ring body on the one end,
    the plate has a flange portion formed annularly by protruding in an axial direction and joined by being fitted in the small diameter portion, a gap is formed between a tip end portion of the flange portion and a base end portion of the small diameter portion, the gap being for pouring a brazing filler metal into a joint portion between the flange portion and the small diameter portion,
a portion of the gap, through which the brazing filler metal is poured, is free of all of the brazing filler metal after the pouring, and
the portion of the gap extends for an entire distance between the tip end portion of the flange portion and the base end portion of the small diameter portion.

* * * * *